(12) United States Patent
Korsgaard (10) Patent No.: US 12,459,161 B2
(45) Date of Patent: Nov. 4, 2025

(54) MOBILE ON-SITE RECYCLING SYSTEM FOR A WIND TURBINE BLADE

(71) Applicant: LM WIND POWER A/S, Kolding (DK)

(72) Inventor: John Korsgaard, Kolding (DK)

(73) Assignee: LM WIND POWER A/S, Kolding (DK)

( * ) Notice: Subject to any disclaimer, the term of this patent is extended or adjusted under 35 U.S.C. 154(b) by 310 days.

(21) Appl. No.: 17/914,549

(22) PCT Filed: Mar. 24, 2021

(86) PCT No.: PCT/EP2021/057595
§ 371 (c)(1),
(2) Date: Sep. 26, 2022

(87) PCT Pub. No.: WO2021/191292
PCT Pub. Date: Sep. 30, 2021

(65) Prior Publication Data
US 2023/0147058 A1 May 11, 2023

(30) Foreign Application Priority Data

Mar. 27, 2020 (GB) .................................... 2004479
May 20, 2020 (GB) .................................... 2007497

(51) Int. Cl.
*B29B 17/04* (2006.01)
*B02C 18/00* (2006.01)
(Continued)

(52) U.S. Cl.
CPC ...... *B29B 17/0412* (2013.01); *B02C 18/0084* (2013.01); *B02C 21/026* (2013.01);
(Continued)

(58) Field of Classification Search
CPC .............................. Y02W 30/52; Y02W 30/62
See application file for complete search history.

(56) References Cited

U.S. PATENT DOCUMENTS 4,686,008 A    8/1987  Gibson
5,431,347 A *  7/1995  Hayashi ................ B02C 18/142
                                                        241/23

(Continued)

FOREIGN PATENT DOCUMENTS

CN    105856453 A    8/2016
CN    208343226 U    1/2019
(Continued)

OTHER PUBLICATIONS

Proceedings of 19th International Conference on Composite Materials, 2014, Beauson, J et al, "Composite recycling: Characterizing end of life wind turbine blade material".
(Continued)

*Primary Examiner* — Jared O Brown
(74) *Attorney, Agent, or Firm* — Nath, Goldberg & Meyer; Tanya E. Harkins (57) ABSTRACT

A recycling ship configured to sail to an offshore site for recycling a composite material rich structure at the site. The composite material rich structure can include a wind turbine blade, a boat or a ship comprising fiber reinforced composite material. The recycling ship comprises a first processing unit having a cutter configured to receive the composite material rich structure and to section it into composite parts, and a second processing unit having a crusher and/or grinder configured to reduce the size of the composite parts into composite material granulates.

11 Claims, 6 Drawing Sheets

(51) Int. Cl.
  *B02C 21/02* (2006.01)
  *B09B 3/35* (2022.01)
  *B29B 17/00* (2006.01)
  *B29B 17/02* (2006.01)
  *B63B 35/44* (2006.01)

(52) U.S. Cl.
  CPC .............. *B09B 3/35* (2022.01); *B29B 17/02* (2013.01); *B29B 17/04* (2013.01); *B63B 35/44* (2013.01); *B02C 2201/06* (2013.01); *B29B 2017/0094* (2013.01); *B29B 2017/0203* (2013.01); *B29B 2017/0428* (2013.01); *B29B 2017/0468* (2013.01); *B29B 2017/0476* (2013.01); *B29B 2017/0484* (2013.01); *B63B 2035/4473* (2013.01)

(56) References Cited

U.S. PATENT DOCUMENTS

| | | |
|---|---|---|
| 2014/0262728 A1 | 9/2014 | Karanikas |
| 2017/0362406 A1 | 12/2017 | Li et al. |
| 2019/0066062 A1* | 2/2019 | Lilly .................. B02C 25/00 |
| 2019/0070680 A1 | 3/2019 | Lilly et al. |
| 2020/0061725 A1* | 2/2020 | Lilly .................. B23D 57/0053 |
| 2020/0340445 A1* | 10/2020 | Denson ................ B23D 47/12 |
| 2021/0237317 A1* | 8/2021 | Dubois ................ B02C 23/10 |

FOREIGN PATENT DOCUMENTS

| | | | |
|---|---|---|---|
| CN | 109895284 A | | 6/2019 |
| CN | 110154274 A | | 8/2019 |
| DE | 102010046685 A1 | | 3/2012 |
| DE | 102013002005 A1 | | 8/2014 |
| DE | 202015003559 U1 | | 6/2015 |
| EP | 3305492 A1 | | 4/2018 |
| ES | 2394704 A1 | | 2/2013 |
| JP | H1035582 A | * | 2/1998 |
| JP | 2002195530 A | * | 7/2002 |
| JP | 2004268710 A | * | 9/2004 |
| KR | 20200024402 A | | 3/2020 |
| WO | 2017/060421 A1 | | 4/2017 |
| WO | 2018/075126 A1 | | 4/2018 |
| WO | 2018/165669 A1 | | 9/2018 |
| WO | 2018/175957 A1 | | 9/2018 |

OTHER PUBLICATIONS

Oliveux, Geraldine et al. "Current status of recycling of fibre reinforced polymers: Review of technologies, reuse and resulting properties." Progress in materials science 72 (2015): 61-99.

Borup, Mads et al. "Recycling and removal of offshore wind turbines-an interactive method for reduction of negative environmental effects." 2002 Global Windpower Conference and Exhibition. European Wind Energy Association (EWEA), 2002.

Jensen, Jonas Pagh. "Evaluating the environmental impacts of recycling wind turbines." Wind Energy 22.2 (2019): 316-326.

Irawan, Chandra Ade et al. "An optimisation model for scheduling the decommissioning of an offshore wind farm." OR Spectrum 41 (2019): 513-548.

Beauson, Justine et al. "Composite recycling: Characterizing end of life wind turbine blade material." 19th International Conference on Composite Materials. 2014.

Larsen, Kari. "Recycling wind turbine blades." Renewable energy focus 9.7 (2009): 70-73.

* cited by examiner

MOBILE ON-SITE RECYCLING SYSTEM FOR A WIND TURBINE BLADE

This is a National Phase Application filed under 35 U.S.C. 371 as a national stage of PCT/EP2021/057595, filed Mar. 24, 2021, an application claiming the benefit of British Patent Application No. 2004479.8, filed Mar. 27, 2020, and British Patent Application No. 2007497.7, filed May 20, 2020, the content of each of which is hereby incorporated by reference in its entirety.

The present disclosure relates to a mobile recycling system for on-site recycling of composite materials. In particular the present disclosure relates to a mobile recycling system of wind turbine blades.

BACKGROUND

The use of wind turbines to generate electricity is a growing market and an important contributor to combat climate changes caused by the use of fossil fuels as an energy source. The Global Wind Energy Council estimated in 2016 that there were more than 341,000 wind turbines running worldwide and that this figure will continue to increase significantly over the next few decades with the accelerated development of wind energy. A number of companies are producing blades for the growing number of turbines worldwide and these blades need to be periodically replaced when they wear out or become damaged. In addition, older generations of wind turbines are being decommissioned as they exceed their expected 20-30 years lifespan.

The dismantling of a wind turbine is not an easy task, and this is traditionally done by splitting the turbine into four large sections: the concrete base, the mast, the rotor blades (usually three), and the nacelle. Each section is either very heavy or very long and thus requires large and polluting vehicles to transport the sections to waste treatment facilities or landfills. The obstacle of handling blade waste in a more economical and environmental feasible way requires new innovative solutions to save costs and lower the environmental impact of decommissioning of wind turbines. Although the prospect of recycling wind turbine blades may be attractive and consistent with the notion of wind energy as a "green" power source, it has not previously been proven technically or economically feasible. As wind turbines have increased in size wind turbine blades have increased too, resulting in increasing costs for disposal or recycling of the wind turbines blades once decommissioned. However, thousands of rotor blades fitted worldwide are coming to the end of their service. Thus, new effective solutions for recycling those blades are urgently needed.

Wind turbine blades are usually manufactured using composite materials comprising fibers such as glass or carbon fibers embedded in a resin polymer matrix (i.e. fiber-reinforced polymers). These composite materials may be recycled into materials useful in manufacturing of other products. One solution has been developed for recycling blades made from glass fiber, wherein the blades are crushed and mixed with other components and become solid fuel for the cement industry replacing traditional fossil fuels. Alternatively, the glass fiber residues may be mixed and be used as part of a cement matrix used in construction. The blades may also be recycled to a further extent typically by using mechanical comminution followed by chemical and/or thermal recycling such as solvolysis and/or pyrolysis for recovery of energy rich organic fractions and/or isolation of higher value components, such as carbon fiber fractions. Such processing "dissolves" the resin matrix and results in liberated fiber materials that may be isolated and reused. The isolated fibers are typically short and randomly oriented after such processing, resulting in low packing density compared to the highly organized and oriented fibers in the composite laminate materials from which they were recycled. Thus, further processing is required to obtain highly organized and oriented fibers.

A solution for transporting the long turbine blades for recycling has been performed by sectioning the wind turbine blade into smaller pieces by e.g. cutting and transporting said pieces to plants for further processing into different products. However, this is not an optimal cost-efficient solution, due to the high costs involved in handling and transporting the blade sections to a recycling plant or a landfill that may be located far from the wind farm. This in particular holds true for offshore windfarms that require transportation on both sea and land. Furthermore, larger recycling plants should be continuously operated and are hence dependent on a steady delivery of composite waste in order to be cost effective in the recycling. US2019/0066062A1 provides one method of recycling a wind turbine blade, wherein the blade may be sectioned at the wind farm before transport to a processing plant to carry out the further steps of recycling.

Thus, there is still a need for new innovative methods for recycling blades in a cost-effective way. Among other objectives, the current disclosure set out to provide a more cost-efficient recycling of composite materials, in particular wind turbine blades.

SUMMARY

It is an object of the present disclosure to provide a recycling system that provides a more tailored and cost-effective solution for the decommissioning and recycling of composite materials such as fiber-reinforced polymers, in particular wind turbine blades. However, also, spinners of wind turbines, nacelle covers of wind turbines, boats, pipes, containers, parts of transport vehicles, parts for airplanes or spacecrafts, parts for construction or other composite material rich structures may be decommissioned and/or recycled by the described method. Thus, although the present disclosure describes the invention with respect to decommissioning and/or recycling of wind turbine blades, it will be known that the wind turbine blade as described herein may be substituted by another composite material rich structures, such as one or more of the examples given above.

The recycling system is composed of individual mobile units that may be transported separately and assembled into a complete recycling system at the desired location. Hence the recycling system provides greater flexibility, lower transport costs and results in an overall more cost-efficient recycling. The recycling system allows for a complete recycling of a wind turbine blade on-site into products, which may form part of new wind turbine blades or may be sold to other industries, e.g. for use in different products.

In particular, it is an object of the present disclosure to provide a recycling system and a method for recycling a wind turbine blade once it is taken out of service.

Thus, the present disclosure relates to a method for recycling a wind turbine blade comprising fiber reinforced composite material the method comprising:

transporting a plurality of mobile processing units to a site comprising the wind turbine blade, wherein the plurality of mobile processing units comprise a first mobile processing unit having a first apparatus configured to section a wind turbine blade to a plurality of wind turbine blade parts, further wherein the plurality of mobile processing units comprise a second mobile processing unit having a second apparatus configured to crush and/or grind the wind turbine blade parts to composite material granulates, an inlet 6b for receiving the wind turbine blade parts and an outlet for outputting the composite material granulates, assembling the plurality of mobile processing units into a recycling system comprising arranging the first mobile processing unit and the second mobile processing unit such that the inlet of the second mobile processing unit is arranged to receive the wind turbine blade parts from the first mobile processing unit, receiving the wind turbine blade by the first mobile processing unit, sectioning the wind turbine blade by the first apparatus to obtain a plurality of wind turbine blade parts, transferring the plurality of wind turbine blade parts to the second mobile processing unit, mechanical crushing and/or grinding the plurality of wind turbine blade parts by the second apparatus to obtain composite material granulates.

The present disclosure further relates to a recycling system for recycling a wind turbine blade comprising fiber reinforced composite material at a site, the recycling system comprising a plurality of mobile processing units, wherein the plurality of mobile processing units comprises:

a first mobile processing unit having a first apparatus configured to section a wind turbine blade to a plurality of wind turbine blade parts;

a second mobile processing unit having a second apparatus configured to crush and/or grind the wind turbine blade parts to composite material granulates, an inlet arrangeable to receive the wind turbine blade parts from the first mobile processing unit and an outlet for outputting the composite material granulates;

and wherein the plurality of mobile processing units are transportable to the site comprising the wind turbine blade of interest and adapted to receive the wind turbine blade by the first processing unit.

The present disclosure also relates to a recycling ship, for recycling a composite material rich structure, such as a wind turbine blade, a spinner of a wind turbine, a nacelle cover, a boat, a ship, a pipe, a container, a part of a transport vehicle, a part for an airplane or a spacecraft, a part for construction or another composite material rich structure, comprising fiber reinforced composite material at a site being offshore or at a site in a harbor. The recycling ship comprises a plurality of processing units, wherein the plurality of processing units comprises:

a first processing unit having a first apparatus configured to section the composite material rich structure to a plurality of composite material parts;

a second processing unit having a second apparatus configured to crush and/or grind the composite material parts to composite material granulates, an inlet arranged to receive the composite material parts from the first processing unit and an outlet for outputting the composite material granulates.

The recycling ship is configured to sail to the site and receive the composite material rich structure by the first processing unit.

The present disclosure also relates to a method for offshore recycling of a composite material rich structure, such as a wind turbine blade, a spinner of a wind turbine, a nacelle cover, a boat, a ship, a pipe, a container, a part of a transport vehicle, a part for an airplane or a spacecraft, a part for construction or another composite material rich structure. The method comprises:

installing a plurality of processing units on a recycling ship, wherein the plurality of processing units comprise a first processing unit having a first apparatus configured to section the composite material rich structure to a plurality of composite parts, and further wherein the plurality of processing units comprise a second processing unit having a second apparatus configured to crush and/or grind the composite parts to composite material granulates, an inlet for receiving the composite parts and an outlet for outputting the composite material granulates, assembling the plurality of processing units into a decommissioning and recycling system comprising arranging the first processing unit and the second processing unit such that the inlet of the second processing unit is arranged to receive the composite parts from the first processing unit, sailing the recycling ship to an offshore site of the composite material rich structure, receiving the composite material rich structure by the first processing unit, sectioning the composite material rich structure by the first apparatus to obtain a plurality of composite parts, transferring the plurality of composite parts to the second processing unit, mechanical crushing and/or grinding the plurality of composite parts by the second apparatus to obtain composite material granulates.

DETAILED DESCRIPTION

The disclosure and particular embodiments of the disclosure will be described in the following. An aspect or an advantage described in conjunction with a particular embodiment is not necessarily limited to that embodiment and can be practiced in any other embodiments even if not so illustrated, or if not so explicitly described.

The present disclosure relates to a method for recycling a wind turbine blade comprising fiber reinforced composite material the method comprising:

transporting a plurality of mobile processing units to a site comprising the wind turbine blade, wherein the plurality of mobile processing units comprise a first mobile processing unit having a first apparatus configured to section a wind turbine blade to a plurality of wind turbine blade parts, further wherein the plurality of mobile processing units comprise a second mobile processing unit having a second apparatus configured to crush and/or grind the wind turbine blade parts to composite material granulates, an inlet for receiving the wind turbine blade parts and an outlet for outputting the composite material granulates, assembling the plurality of mobile processing units into a decommissioning and recycling system comprising arranging the first mobile processing unit and the second mobile processing unit such that the inlet of the second mobile processing unit is arranged to receive the wind turbine blade parts from the first mobile processing unit, receiving the wind turbine blade by the first mobile processing unit, sectioning the wind turbine blade by the first apparatus to obtain a plurality of wind turbine blade parts, transferring the plurality of wind turbine blade parts to the second mobile processing unit, mechanical crushing and/or grinding the plurality of wind turbine blade parts by the second apparatus to obtain composite material granulates.

The present disclosure also relates to a recycling system for recycling a wind turbine blade comprising fiber reinforced composite material at a site, the recycling system comprising a plurality of mobile processing units, wherein the plurality of mobile processing units comprises:

a first mobile processing unit having a first apparatus configured to section a wind turbine blade to a plurality of wind turbine blade parts;

a second mobile processing unit having a second apparatus configured to crush and/or grind the wind turbine blade parts to composite material granulates, an inlet arrangeable to receive the wind turbine blade parts from the first mobile processing unit and an outlet for outputting the composite material granulates;

and wherein the plurality of mobile processing units are transportable to the site comprising the wind turbine blade and adapted to receive the wind turbine blade by the first processing unit.

The processing units may each be configured to perform one or more steps in the recycling of the wind turbine blade. The individual processing units can therefore be transported to a desired location when needed and transported to a new location once the desired task is performed by disconnecting the processing unit from the remainder of the recycling system. The separation of the recycling steps into different individual processing units allow for optimal use and efficiency of the individual units. The individually processing units may be mobile processing units that may be transported separately. In an embodiment the mobile processing unit(s) may be loaded onto one or more trucks or trailers that are driven to a site, e.g. a wind farm, where a wind turbine blade is to be decommissioned. In a preferred embodiment, the mobile processing units may be individual or a plurality of shipping containers, such as a 20 feet or 40 feet container, containing the respective apparatus of the processing unit, that are unloaded at the desired location and assembled into the recycling system.

One or more of the mobile processing units may include a mobility system such that they are easy to move and assemble on-site into a recycling system. Such mobility system may include wheels, continuous track/caterpillar systems, skids, or any other suitable system.

The first mobile processing unit may have an inlet for receiving the wind turbine blade and an outlet for outputting the wind turbine blade parts. Arranging the first mobile processing unit and the second mobile processing unit may comprise connecting the outlet of the first mobile processing unit to the inlet of the second mobile processing unit. The inlet for receiving a wind turbine blade may be any system suitable for holding/supporting the weight of the wind turbine blade while sectioning the blade into a plurality of blade composite parts using a first apparatus in the first mobile processing unit. For example, the inlet may comprise a conveyor belt or rails for moving the wind turbine blade into the first mobile processing unit.

The first processing unit may comprise a first apparatus that is configured to section the wind turbine blade into a plurality of wind turbine blade parts by cutting the wind turbine blade at an intermediate location, e.g. along a length of the wind turbine blade. Preferably, the first apparatus is configured to section the blade into blade parts having a length of 2-3 meters. The wind turbine blade may be cut to provide blade parts of substantially the same length. Alternatively, the wind turbine blade may be cut to provide blade parts of different sizes and/or shapes. Furthermore, the cutting may be performed such that the wind turbine blade is cut into different blade parts depending on the content of material. For example, the wind turbine blade may be cut such that some blade parts comprise mainly fiber rich fractions (i.e. reinforcement fibers), other blade parts comprise mainly resin rich fractions (i.e. polymer matrix) and yet other blade parts comprise mainly filler rich fractions etc. The intelligent sectioning of the wind turbine blade allows for more uniform wind turbine blade parts and composite material granulates in terms of material content. The sectioning in the first apparatus may be performed with conventional means known in art using a cutting tool, e.g. selected from the group consisting of a wire saw having an endless/loop abrasive cable or and oscillating/reciprocating cable, a circular saw, an impact blade, a torch and/or a waterjet cutter. After sectioning, the plurality of wind turbine blade parts may then be transported via the outlet of the first processing unit to the inlet of the second processing unit using conventional means in the art such as a conveyer belt. Alternatively, the wind turbine blade parts may be fed manually to the inlet of the second processing unit using e.g. a crane or loader.

The second processing unit may comprise a second apparatus that is configured for mechanical crushing and/or grinding the plurality of wind turbine blade parts into composite material granulates of a desired size. Usually crushing is needed prior to grinding unless the wind turbine blade is sectioned into blade parts that are small enough for the grinder to handle. Crushing is also often referred to as shredding in the art and may be used interchangeably. Likewise, grinding is also often referred to as milling in the art and may be used interchangeably. The crushing/shredding may be performed in a single crushing/shredding step or a sequence of continuously finer crushing/shredding steps. The second processing unit may comprise a plurality of sub-units, e.g. each being individually transportable. The second apparatus may comprise a plurality of second sub-apparatuses, e.g. each being comprised by a respective sub-unit of the second processing unit. The plurality of second sub-apparatuses may be configured to sequentially crush/shred/grind the wind turbine blade parts into smaller parts, such as granulates. The crushing step may be performed with conventional crushing means such as by feeding the plurality of wind turbine blade parts via the inlet to a feed bin of a crushing machine and conveying the wind turbine blade parts from the feed bin to a rotating crushing drum. The crushing drum may be equipped with e.g. teeth crushing the blade parts in the rotating crushing drum to produce a plurality of blade pieces. Alternatively, a cutting or crushing mill may be used instead of a crushing drum. Both have their own benefits: cutting mills give more homogeneous fiber length distribution and longer fibers, whereas hammer mills don't have blades that require sharpening, thus reducing wear and increasing the output. The blade pieces typically have a maximum length dimension in the range between about 20 mm and about 100 mm following the step of crushing, more preferably between about 50 mm and about 75 mm following the step of crushing.

After crushing the blade pieces may be grinded into smaller size composite material granulates, typically have a maximum length dimension in the range between 50 µm-10 mm. The grinding may be performed in a single grinder or a sequence of continuously finer grinding steps to obtain composite material granulates of a desired size. The second apparatus may be a single unit designed to both crushing and grinding or two or more separate units connected, e.g. wherein a first unit crushes the plurality of blade parts into blade pieces and one or more subsequent units grinds the blade pieces into composite material granulates. The composite material granulates may then be transported via the outlet to suitable collecting means such as a container or tank truck and sold e.g. as a solid fuel for the cement industry, as part of a cement matrix for construction or for a different purpose. In some embodiments the composite material granulates may be separated based on their contents and particle size using cyclones and sieves prior to being transported via the outlet to suitable collecting means. Such separation allows to further divide the composite material into more homogenous fractions being suitable for different purposes. Typically, finer composite material granulates will have a tendency to contain some individual granulates entirely or almost entirely consisting of resin. Coarser composite material granulates will have a tendency to individually contain the same resin to fiber ratio as the blade pieces having been crushed.

In an embodiment the composite material granulates may be transported via the outlet of the second processing unit to the inlet of a third processing unit for further recycling steps. The composite material granulates may have been separated based on their contents and/or particle size using cyclones and sieves prior to being transported via the outlet of the second processing unit to the inlet of a third processing unit for further recycling steps. In some embodiments, the composite material granulates may be sorted in resin rich and fiber rich composite material granulates, e.g. the fiber rich composite material granulates may comprise a higher fraction of fiber than the resin rich composite material granulates, and the resin rich composite material granulates may comprise a higher fraction of resin than the fiber rich composite material granulates. In some embodiments only the fiber rich composite material granulates, or the resin rich composite material granulates are being transported via the outlet of the second processing unit to the inlet of a third processing unit for further recycling steps. In an embodiment both the fiber rich composite material granulates and the resin rich composite material granulates are transported separately (i.e. stepwise) via the outlet of the second processing unit to the inlet of a third processing unit such that they are subjected for further recycling steps separately. The separate transport by be either a stepwise transport of first the fiber rich composite material granulates and then a resin rich composite material granulates or vice versa. Alternatively, the outlet may be divided into a plurality of outlets each configured for transporting different composite material granulates depending on content and/or particle size.

Cutting, crushing and grinding are typically associated with generation of airborne particles that may have a negative impact on human health and pollute the environment. Thus, the sectioning, crushing and grinding may be performed using dust suppression means to avoid any local pollution threat in terms of air borne resin and/or fiber particles and assure employee safety. Any conventional dust suppression may be used such as liquid or foam spray, vacuum entrapment, filters, or other suitable dust suppression means known in the art. In embodiments using liquid or foam spray an atomized spray may be used to cover the area of cutting, crushing or grinding machine. In an embodiment, the crushing and/or grinding machine may include internal dust suppression measures such as a mounted dust collection rig.

The plurality of mobile processing units may comprise a third mobile processing unit having a third apparatus configured for chemical recycling e.g. solvolysis and/or thermal recycling e.g. pyrolysis of composite material granulates, an inlet for receiving the composite material granulates, an outlet for a liquid fraction and an outlet for a solid fiber fraction. The outlet of the second processing unit may be arrangeable to be connected to the inlet of the third processing unit. Assembling the plurality of mobile processing unit may further comprise connecting the outlet of the second mobile processing unit to the inlet of the third mobile processing unit, and the method comprises transferring the composite material granulates via the outlet of the second mobile processing unit and the inlet of the third mobile processing unit to the third apparatus and subjecting the composite material granulates to thermal recycling and/or chemical recycling in the third apparatus to obtain a mixture comprising a liquid fraction and a solid fiber fraction.

In an embodiment, the method comprises transferring resin rich composite material granulates via the outlet of the second mobile processing unit and the inlet of the third mobile processing unit to the third apparatus and subjecting the resin rich composite material granulates to thermal recycling and/or chemical recycling in the third apparatus to obtain a mixture comprising a major liquid fraction and a minor solid fiber fraction.

In an alternative embodiment, the method comprises transferring a fiber rich composite material granulate via the outlet of the second mobile processing unit and the inlet of the third mobile processing unit to the third apparatus and subjecting the fiber rich composite material granulates to thermal recycling and/or chemical recycling in the third apparatus to obtain a mixture comprising a minor liquid fraction and a major solid fiber fraction.

Chemical recycling, such as solvolysis uses chemical depolymerization of the resin matrix by using heated solvents or solvent mixtures. Depending on the solvent, it can be further classified as hydrolysis (using water), glycolysis (using glycols), and acid digestion (using acid). Thus, solvolysis decompose the polymer resin in the composite material granulates in the presence of a solvent, typically water such that the polymer is hydrolyzed into an organic fraction and thereby liberating the fiber fraction in the composite material granulates. Thus, the solvolysis not only allow recovery of a fiber fraction but also allows for recovery of the monomers used in the resin. These monomers may be subjected for further purification steps such as distillation under vacuum that allow them to be used as part of a resin in construction of new wind turbine blades. In the present context it should be understood that the solvolysis in the third apparatus may be performed under any suitable solvolysis conditions known in the art by using different solvents, additives, pressures, temperatures and catalysts such as those described in e.g. Oliveux et al., 2015. In one embodiment the solvolysis may be performed under supercritical conditions. A supercritical fluid has the usual meaning in the art and refers to any solvent at a temperature and pressure above its critical point, where distinct liquid and gas phases do not exist. Without being bound by theory supercritical conditions allow for better penetration of the resin by the solvent and a more effective solvolysis.

Thermal recycling, such as pyrolysis on the other hand decompose the polymer resin in the granulates at high temperature typically in the absence of oxygen under an inert atmosphere (or in the presence of small amounts of oxygen) to liberate and recover the fibers. The pyrolysis processes typically operate between 450° C. and 700° C., depending on the type of resin. Polyester resins decompose fully at a temperature of 400-450° C., whereas epoxides or thermoplastics such as polyether ether ketone (PEEK) require higher temperatures of 500-550° C. The high temperature breaks down the resin into compounds of lower molecular weight, such as gases and crude oils (i.e. liquid organic fraction) thereby liberating the fiber fraction. The gases that evolve during pyrolysis may be used as fuel to provide heat for the process. The third apparatus configured for thermal recycling and/or chemical recycling may use any conventional types of pyrolysis such as classic conveyor pyrolysis and fluidised-bed pyrolysis or other pyrolysis-based methods such as microwave-assisted pyrolysis, super-heated steam pyrolysis, catalytic pyrolysis and gasification.

The mobile processing unit may decompose the granulates using thermal recycling and/or chemical recycling under high pressure and temperature to depolymerize the composite material granulates into a mixture of crude oils and a solid fiber fraction. The decomposition of the granulates may also be performed in a series of thermal recycling and/or chemical recycling steps each step subjecting the granulates to different thermal recycling and/or chemical recycling conditions allowing different product streams to be isolated depending on the conditions chosen. In a preferred embodiment the third processing unit uses thermal depolymerization (TDP) (also known as hydrous pyrolysis) in which the granulates are thermal decomposed (i.e. depolymerized) in the presence of water under high temperatures and pressures. Preferably the hydrous pyrolysis/solvolysis is performed at least 150 bar and at least 150° C.

The solid fiber fraction may be separated from the liquid fraction after the thermal recycling and/or chemical recycling, e.g. using filtering or other conventional means in the art. After separation the solid fiber fraction exit the mobile processing unit via the outlet for the solid fiber fraction and may be collected in suitable collection means such as a container. The solid fiber fraction may be subjected to a drying step in the container prior to transport to a plant wherein the fibers may be processed further and reused, e.g. in production of new materials. The liquid fraction obtained from the thermal recycling and/or chemical recycling in the third processing unit may exit the third processing unit via the outlet for the liquid fraction and may be collected in suitable collecting means, such as tank truck, prior to transportation to a site for further processing or use. The liquid fraction may be an organic fraction (crude oils) if pyrolysis is used or a mixture of an organic fraction and an aqueous fraction if solvolysis (i.e. hydrolysis) or hydrous pyrolysis is used. In a particular preferred embodiment, where hydrous pyrolysis or solvolysis is used the liquid fraction may be transported via the outlet for the liquid fraction of the third processing unit to the inlet of a fourth mobile processing unit using conventional means in the art such as pumping the liquid fraction in one or more pipes. The benefit of further including the thermal recycling and/or chemical recycling step in the recycling system on-site is that the composite material granulates may be converted into more versatile and valuable products and further lower the transport costs due to a reduction in the waste volume.

The plurality of mobile processing units may comprise a fourth mobile processing unit having a fourth apparatus configured for partitioning of the liquid product fraction, an inlet for receiving the liquid fraction, an outlet for an organic fraction and an outlet for an aqueous fraction. The outlet for the liquid fraction of the third processing unit may be arrangeable to be connected to the inlet of the fourth processing unit. Assembling the plurality of mobile processing unit may further comprise connecting the outlet for the liquid fraction of the third mobile processing unit to the inlet of the fourth mobile processing unit, and the method comprises transferring the liquid fraction via the outlet for the liquid fraction of the third mobile processing unit and the inlet of the fourth mobile processing unit to the fourth apparatus and partitioning the liquid fraction in the fourth apparatus to obtain an organic fraction and an aqueous fraction. The organic fraction is formed during the thermal recycling and/or chemical recycling from decomposition of the resin in the composite material granulates.

The fourth mobile processing unit may be used where hydrous pyrolysis or aqueous solvolysis is used. One advantage of this embodiment is that the aqueous fraction may be separated from the organic fraction obtained from the decomposition of the resin prior to transport of the organic fraction. This allows the water fraction to be returned and reused in the third processing unit for another round of hydrous pyrolysis or solvolysis. Furthermore, the separation also allows the organic fraction to be used as energy source on-site for the pyrolysis and/or sold separately e.g. as a fuel to other industries or for the production of fine chemicals. The apparatus in the fourth mobile unit may also be configured for distillation of the organic fraction to further separate the organic components in the organic fraction into higher value products such as monomers that may be used as part of a resin in the production in new fiber reinforced composite materials.

The mobile processing units may be transported and/or assembled in a harbor/dock to receive and recycle wind turbine blades transported at sea from offshore wind farms. Alternatively, the mobile processing units may be transported and/or assembled in a harbor/dock to receive and recycle boats or ships comprising composite materials. Alternatively or additionally, the processing units may be transported and/or assembled on a ship for decommissioning and recycling of wind turbine blades offshore.

The above method or parts thereof may be conducted on a recycling ship at a site offshore, e.g. the method may comprise arranging the plurality of mobile processing unit on a ship, and transporting the plurality of mobile processing units may comprise sailing the ship to the site. Alternatively, the above method or parts thereof may be conducted on a recycling ship in a harbor e.g. the method may comprise arranging the plurality of mobile processing unit on a ship, and transporting the plurality of mobile processing units may comprise sailing the ship to a harbor to collect decommissioned wind turbine blades for recycling. The recycling ship may perform the recycling of the wind turbine blades in the harbor or during sailing/transport to the next site such as a harbor or offshore wind farm. The recycling ship may also be configured to recycle other composite waste such as boats or ships.

In an embodiment the ship comprises one or more storage spaces, and the method comprises storing one or more of the composite material granulates, the liquid fraction, the solid fiber fraction, the organic fraction and/or the aqueous fraction in the one or more storage spaces.

Thus, the present disclosure also relates to a recycling ship, for recycling a composite material rich structure, such as a wind turbine blade, a spinner of a wind turbine, a nacelle cover, a boat, a ship, a pipe, a container, a part of a transport vehicle, a part for an airplane or a spacecraft, a part for construction or another composite material rich structure, comprising fiber reinforced composite material at a site being offshore or at a site in a harbor. The present disclosure also relates to a method for offshore recycling of a composite material rich structure, such as a wind turbine blade, a spinner of a wind turbine, a nacelle cover, a boat, a ship, a pipe, a container, a part of a transport vehicle, a part for an airplane or a spacecraft, a part for construction or another composite material rich structure, wherein the method comprises
- installing a plurality of processing units, such as one or more of the above disclosed processing units, on a recycling ship, wherein the plurality of processing units comprise a first processing unit having a first apparatus configured to section the composite material rich structure to a plurality of composite parts (for example, the first processing unit may comprise a saw and/or a waterjet cutter operable to cut the composite material rich structure), further wherein the plurality of processing units comprise a second processing unit having a second apparatus configured to crush and/or grind the composite parts to composite material granulates, an inlet for receiving the composite parts and an outlet for outputting the composite material granulates,
- assembling the plurality of processing units into a decommissioning and recycling system comprising arranging the first processing unit and the second processing unit such that the inlet of the second processing unit is arranged to receive the composite parts from the first processing unit.

The disclosed recycling ship comprises a plurality of processing units, such as one or more of the above disclosed processing units, wherein the plurality of processing units comprises:
- a first processing unit having a first apparatus configured to section the composite material rich structure to a plurality of composite parts (for example, the first processing unit may comprise a saw and/or a waterjet cutter operable to cut the composite material rich structure);
- a second processing unit having a second apparatus configured to crush and/or grind the composite parts to composite material granulates, an inlet arranged to receive the composite parts from the first processing unit and an outlet for outputting the composite material granulates.

The recycling ship may be configured to sail to the site and receive the composite material rich structure by the first processing unit. The method for offshore recycling may comprise sailing the recycling ship to an offshore site of the composite material rich structure.

The composite material rich structure may be received by the first processing unit. The composite material rich structure may be sectioned by the first apparatus to obtain a plurality of composite parts. The plurality of composite parts may be transferred to the second processing unit. The plurality of composite parts may be mechanically crushed and/or grinded by the second apparatus to obtain composite material granulates.

This particular embodiment has the advantage that processing and recycling offshore structures, such as wind turbine blades of offshore wind turbines, offshore minimizes the waste volume and allows more blades to be decommissioned before the ship needs to return to dock. Thus, smaller ships are needed for decommissioning of the wind turbine blades and/or less total travel time is needed.

In a preferred embodiment the recycling ship may be configured to recycle several types of composite material rich structures, such as both wind turbine blades and boats or ships, such that the first processing unit having a first apparatus is configured to receive and section the boat or ship to a plurality of boat or ship parts and/or to receive and section the wind turbine blade to a plurality of wind turbine blade parts.

The plurality of processing units on the recycling ship may comprise a third processing unit, such as the third mobile processing unit as described earlier, such as a processing unit having a third apparatus configured for chemical recycling, e.g. solvolysis and/or thermal recycling, e.g. pyrolysis, of composite material granulates, an inlet for receiving the composite material granulates, and an outlet for a liquid fraction and an outlet for a solid fiber fraction. The outlet of the second processing unit may be arrangeable to be connected to the inlet of the third processing unit. The outlet of the second processing unit may be connected to the inlet of the third processing unit.

The plurality of processing units on the recycling ship may comprise a fourth processing unit, such as the fourth mobile processing unit as described earlier, such as a processing unit having a fourth apparatus configured for partitioning of the liquid fraction, an inlet for receiving the liquid fraction, an outlet for an organic fraction and an outlet for an aqueous fraction. The outlet for the liquid fraction of the third processing unit may be arrangeable to be connected to the inlet of the fourth processing unit. The outlet for the liquid fraction of the third processing unit may be connected to the inlet of the fourth processing unit.

The plurality of processing units on the recycling ship may be fixed installations on the ship. Alternatively, the plurality of processing units may be mobile, e.g. the plurality of processing units may be adapted to be loaded on the ship and/or may be adapted to be unloaded from the ship. For example, the processing units may be individual or a plurality of shipping containers, such as a 20 feet or 40 feet container, containing the respective apparatus of the processing unit, that are loaded/unloaded at the recycling ship.

The first processing unit of the recycling ship may comprise an inlet for receiving the composite material rich structure and an outlet for outputting the composite parts. The inlet of the second processing unit of the recycling ship may be arrangeable to be connected to the outlet of the first processing unit of the recycling ship.

The recycling ship may comprise one or more storage spaces configured to store one or more of the composite material granulates, the liquid fraction, the solid fiber fraction, the organic fraction and/or the aqueous fraction.

The recycling ship may comprise a water intake, such as a sea water intake. The water intake may be configured to take in water from where the recycling ship is deployed, e.g. from the sea or from a lake. Water from where the recycling ship is deployed, e.g. sea water, may be used in one or more of the processes of the plurality of processing units on the recycling ship. The sectioning in the first processing unit and/or the crushing and/or grinding in the second processing unit may be performed using water, such as sea water, e.g. with means for dust suppression using water, e.g. from the water intake. Alternatively or additionally, the sectioning in the first processing unit may be performed by means of a water jet cutter using water from the water intake.

The recycling ship may comprise a water outlet, e.g. to dispense with water used in one or more of the processes, e.g. water from the water intake, such as sea water, used in one or more of the processes. The recycling ship may comprise a filtering and/or cleaning unit, to filter and/or clean the water prior to being dispensed via the water outlet.

The solid input streams and output streams between different (mobile) processing units in any of the embodiments may be transported using conventional means known in the art such as conveyer belts, conveyer rollers, conveyer screws, chutes or other means known to the person skilled in the art. Likewise, the liquid output streams from e.g. thermal recycling and/or chemical recycling may be transported between (mobile) processing units using conventional means known in the art such as pipes and pumps.

Sectioning of the composite material rich structure, whether by the first processing unit on the recycling ship or by the first mobile processing unit, may be provided such that the composite material rich structure is sectioned into composite parts having different relative amounts of different materials. For example, the composite material rich structure may comprise a plurality of materials, e.g. including a primary material, a secondary material, a tertiary material, and/or a quaternary material. For example, the composite material rich structure may be a wind turbine blade comprising glass fibre rich portions, carbon fibre rich portions, sandwich core material, such as balsa or foam, etc. The composite material rich structure may be sectioned into a plurality of composite parts comprising a first composite part and a second composite part, wherein the first composite part comprises a first primary relative amount of the primary material and a first secondary relative amount of the secondary material, and the second composite part may comprise a second primary relative amount of the primary material and a second secondary relative amount of the secondary material, wherein the first primary relative amount of the primary material is larger than the second primary relative amount of the primary material and/or the first secondary relative amount of the secondary material is smaller than the second secondary relative amount of the secondary material.

For example, in the case of the composite material rich structure being a wind turbine blade, the plurality of composite parts may comprise one or more of a spar cap, a bow panel, an aft panel, a shear web, a trailing edge part, a leading edge part, and a root section. Furthermore, one or mor of these parts may be further partitioned if considered useful. For example, the shear web, the bow panel and/or the aft panel, which are usually sandwich constructions, may be further sectioned into shell parts mainly comprising fibre composite material and core parts mainly comprising sandwich core material, such as balsa or foam.

The exemplified embodiments are not intended to be limiting in anyway and the skilled person will be aware of alternative setups while still being within the spirit of the disclosure. As a non-limiting example, depending of the desired setup of the recycling system one or more process steps of the recycling process may be combined into a single mobile processing unit if desired. Likewise, several process steps may be split from a single mobile processing unit into several processing units. As a non-limiting example, the crushing and grinding may be performed within the same mobile processing unit or divided into two or more separate mobile processing units.

It follows that any feature of one aspect or embodiment of the disclosure apply equally to any other aspect or embodiment of the disclosure, e.g. particular features described with respect to the disclosed method applies equally to the recycling system and/or the recycling ship, and vice versa.

The recycling system allows for cost-efficient recycling since the wind turbine blades are converted on-site, e.g. offshore, into product streams that takes up less space, are easier to handle and may be transported separately hence superseding the need for large special transports.

The disclosed on-site mobile recycling system is not limited to the recycling of wind turbine blades but may be used for any cured composite material. Thus, the system is suitable for the recycling of any cured composite material comprising a fiber reinforced thermoset or thermoplastic polymer (i.e. reinforcing fibers in a cured resin matrix). The reinforcing fibers may be made of material comprising carbon, graphite, glass, boron, ceramics, aramids, polyolefins, polyethylene's or other suitable materials. The resin matrix may be made of a resin material comprising thermoplastic resins such as polyamides, polyesters (e.g. thermoplastic polyesters, such polyesters based on polybutylene terephthalate (PBT) and polyethylene terephthalate (PET)), polyolefins and fluoropolymers, thermosetting resins such as polyisocyanates, epoxides, bismaelimides, polyimides, bezoxazines, cyanate esters, and polyesters (e.g. thermosetting polyester, e.g. polyester resin) or hybrid polymer resins with properties of both thermosetting resins and thermoplastic resins or other suitable resin materials. Thus, the mobile recycling system may additionally be used for recycling of, e.g., boats, aircrafts or the like made of composite material such as glass fiber or carbon reinforced polymers.

Embodiments of the disclosure will be described in the following with regard to the accompanying figures. Like reference numerals refer to like elements throughout. Like elements may, thus, not be described in detail with respect to the description of each figure. The figures show one way of implementing the present disclosure and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Figure 1:
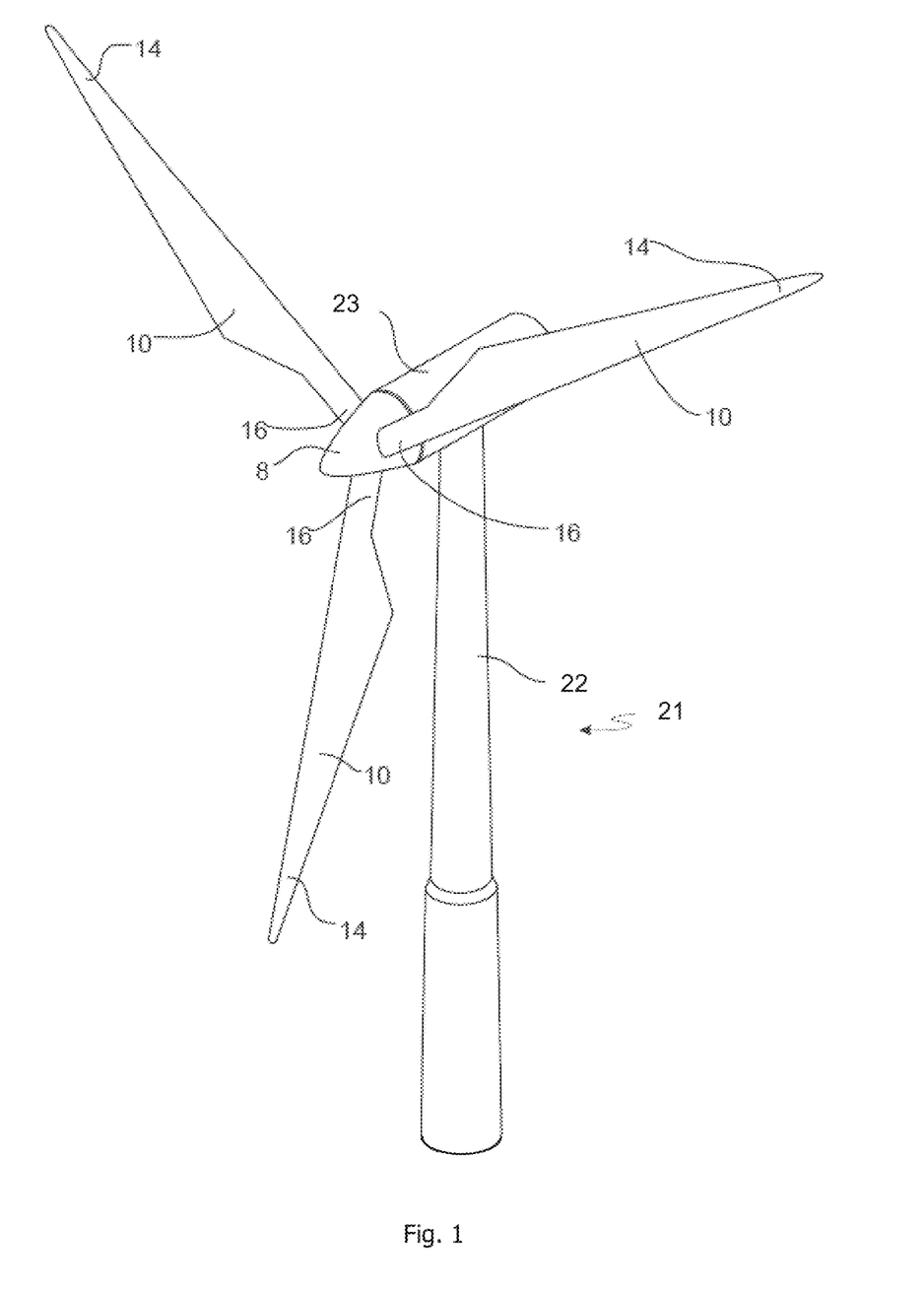
FIG. 1 is a schematic diagram illustrating an exemplary wind turbine.

FIG. 1 illustrates a conventional modern upwind wind turbine 21 according to the so-called "Danish concept" with a tower 22, a nacelle 23 and a rotor with a substantially horizontal rotor shaft. The rotor includes a hub 8 and three blades 10 extending radially from the hub 8, each having a blade root 16 nearest the hub and a blade tip 14 furthest from the hub 8. Typically, such a wind turbine may be operating for 20-25 years, after which the wind turbine 21 may be disassembled into a plurality of individual components, e.g. the tower 22, the nacelle 23, the hub 8, and the blades 10.

Figure 2:
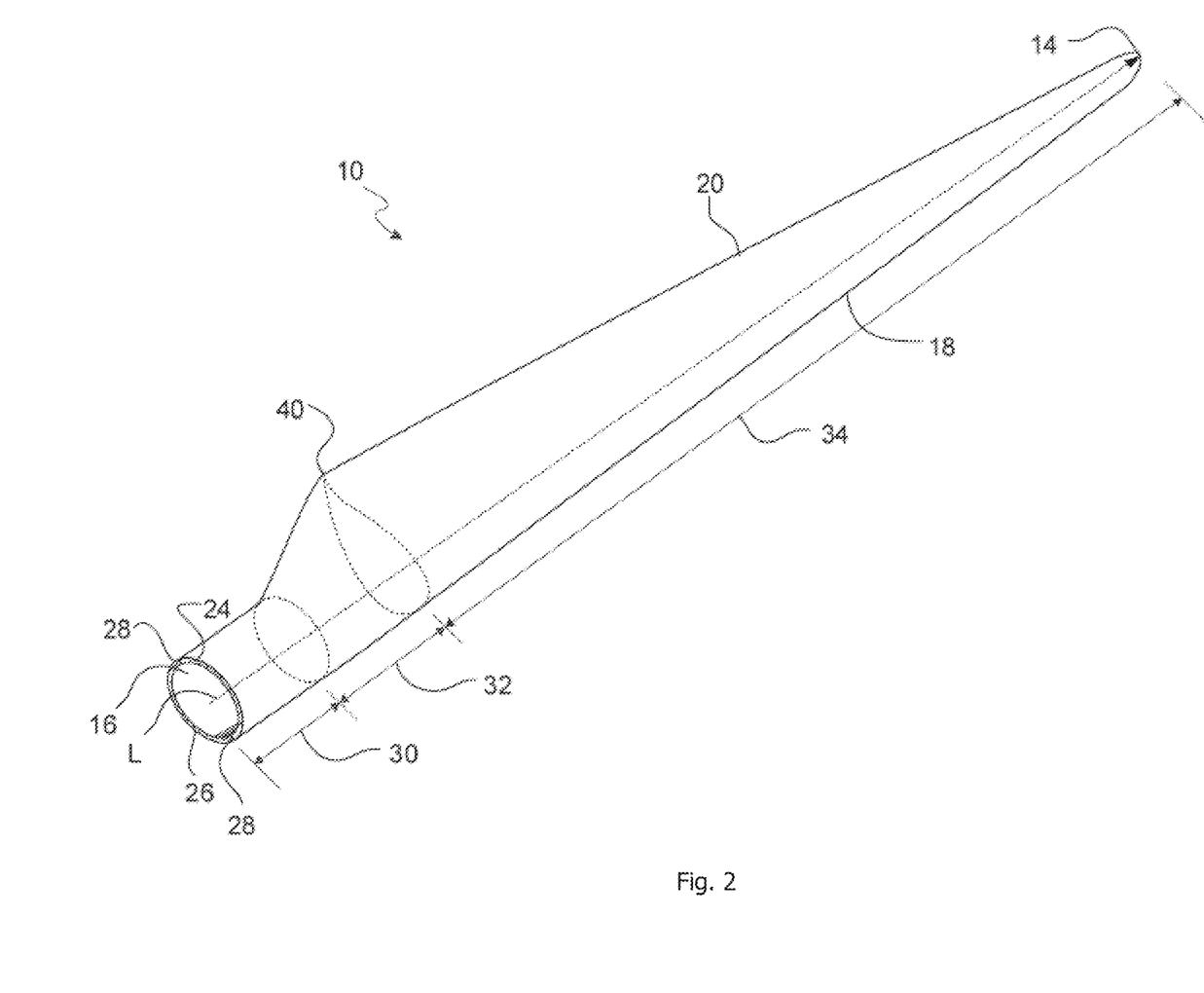
FIG. 2 is a schematic diagram illustrating an exemplary wind turbine blade for processing in a recycling system.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fiber-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints 28 extending along the trailing edge 20 and the leading edge 18 of the blade 10. Typically, the root ends of the blade shell parts 24, 26 has a semi-circular or semi-oval outer cross-sectional shape.

Figure 3:
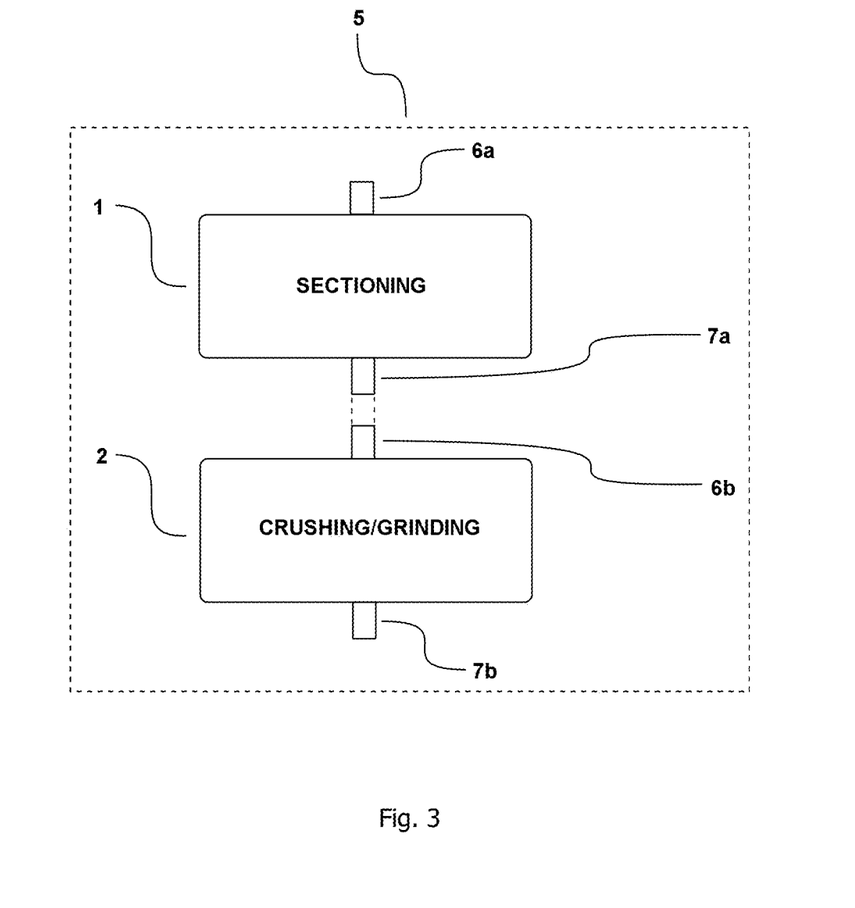
FIG. 3 is a schematic diagram illustrating one example of a mobile recycling system comprising the connected mobile processing units.

FIG. 3 schematically illustrates one example of a recycling system according to the present disclosure composed of individual processing units 1 and 2 assembled into a recycling system 5. The first processing unit 1 comprises a first apparatus that is configured to section the wind turbine blade into a plurality of wind turbine blade parts by cutting the wind turbine blade at an intermediate location, e.g. along a length of the wind turbine blade. After sectioning the plurality of blade parts may then be transported via the outlet 7a of the first processing unit 1 to the inlet 6b of the second processing unit 2 using conventional means in the art such as a conveyer belt. The second processing unit 2 comprises a second apparatus that is configured for mechanical crushing and/or grinding the plurality of blade parts into composite material granulates of a desired size. After the crushing the blade pieces may be subjected to grinding such that the blade pieces are processed into smaller size composite material granulates. The grinding may be performed in a single grinder or a sequence of continuously finer grinding steps to obtain granulates of a desired size. The second apparatus may be a single unit designed to both crushing and grinding or two or more separate units connected, e.g. wherein a first unit crushes the plurality of blade parts into blade pieces and one or more subsequent units grinds the blade pieces into composite material granulates. The composite material granulates may then be transported via the outlet 7b to suitable collecting means such as a container or tank truck. Optionally the granulates may be separated based on their contents and particle size using cyclones and sieves prior to being transported via the outlet 7b to separate suitable collecting means.

Figure 4:
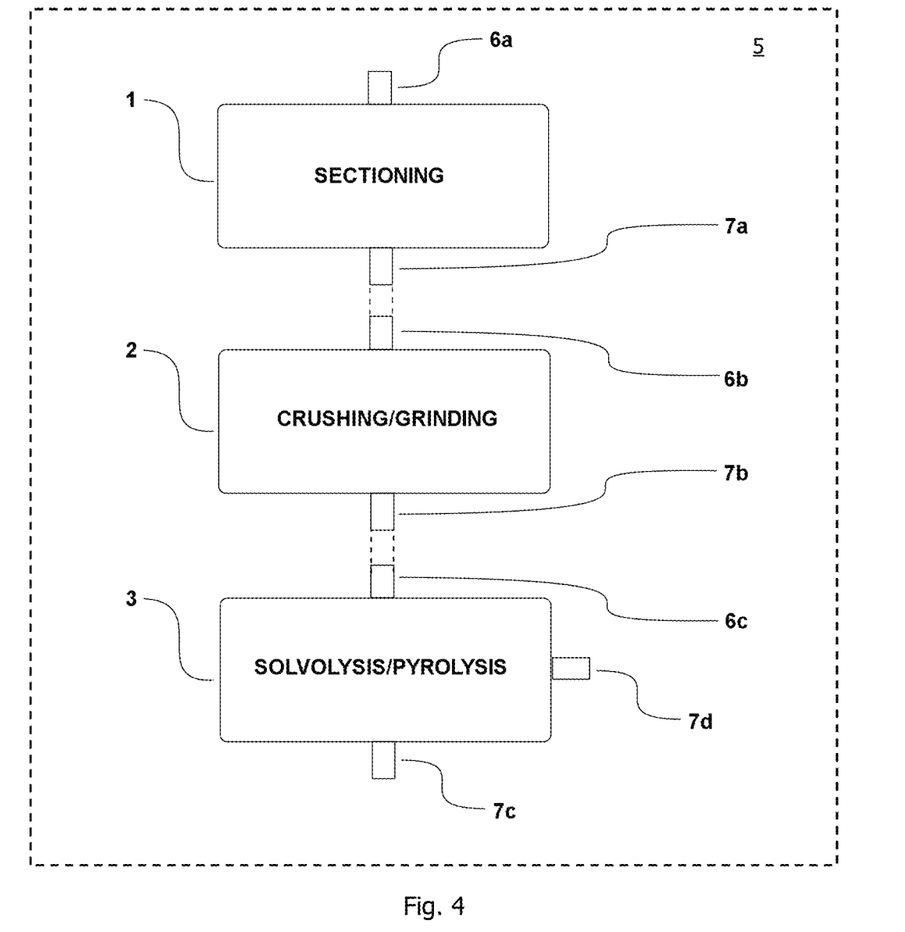
FIG. 4 is a schematic diagram illustrating another example of a mobile recycling system comprising the connected mobile processing units.

FIG. 4 schematically illustrates another non-limiting example of a recycling system according to the present disclosure composed of individual processing units 1, 2 and 3 assembled into a recycling system 5. In this embodiment the plurality of mobile processing units comprise a third mobile processing unit 3 having a third apparatus configured for thermal recycling, such as pyrolysis and/or chemical recycling, such as solvolysis of composite material granulates, an inlet 6c for receiving the composite material granulates, and an outlet 7c for a liquid fraction and an outlet 7d for a solid fiber fraction and wherein the outlet 7b of the second processing unit is connected to the inlet 6c of the third processing unit. In this embodiment the composite material granulates are further decomposed on-site by thermal recycling and/or chemical recycling which depolymerize the polymer resin and liberates the solid fiber fraction present in the composite material to obtain a mixture comprising a liquid fraction and a solid fiber fraction.

Figure 5:
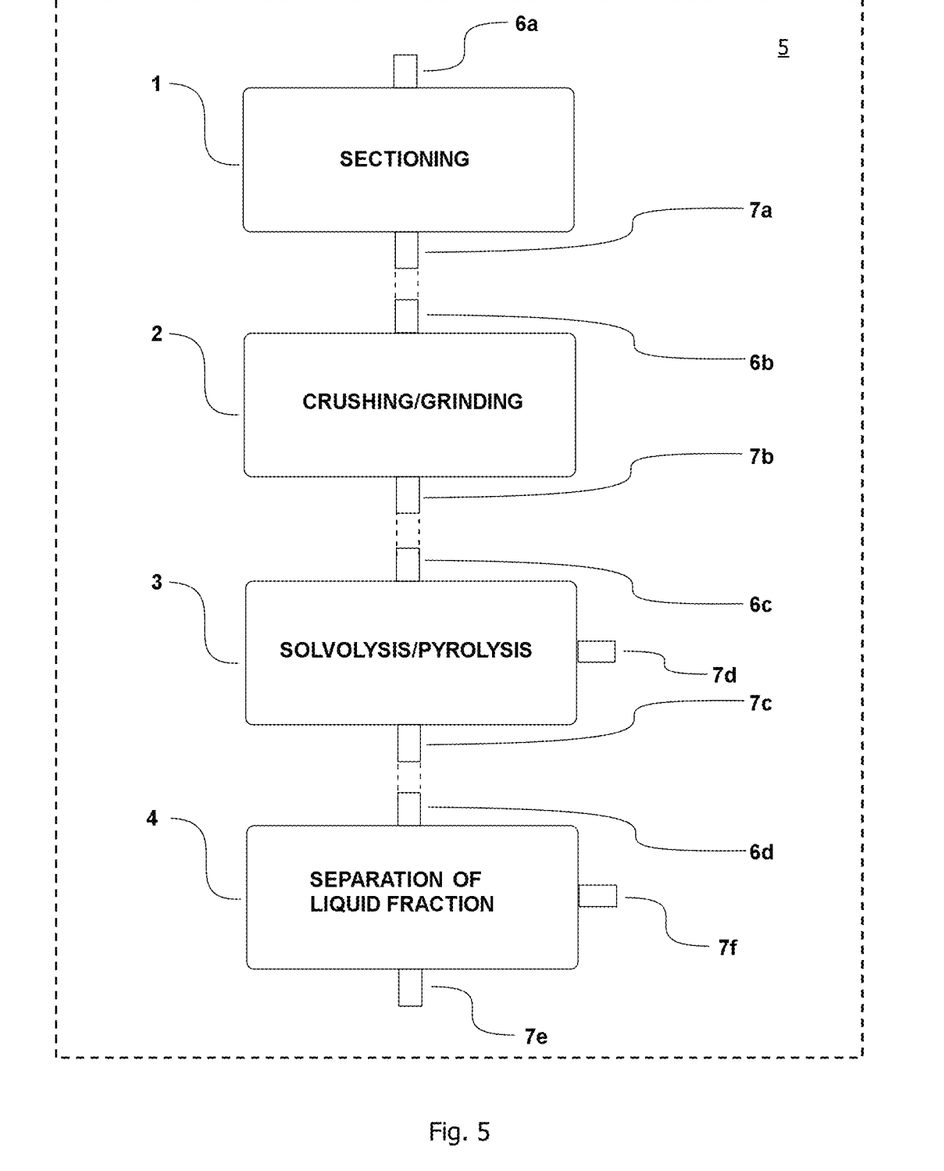
FIG. 5 is a schematic diagram illustrating yet another example of a mobile recycling system comprising the connected mobile processing units, and FIG. 6 schematically illustrates an exemplary recycling ship.

FIG. 5 schematically illustrates yet another non-limiting example of a recycling system according to the present disclosure composed of individual processing units 1, 2, 3 and 4 assembled into a recycling system 5. In this embodiment the plurality of mobile processing units comprise a fourth mobile processing unit 4 having a fourth apparatus configured for partitioning of the liquid fraction, an inlet 6d for receiving the liquid fraction, an outlet 7e for an organic fraction and an outlet 7f for an aqueous fraction and wherein the outlet 7c for the liquid fraction of the third processing unit is connected to the inlet 6d of the fourth processing unit. The liquid fraction is allowed to separate into an aqueous phase and an organic phase in the fourth apparatus such as a separation tank. The water fraction may then be returned and reused in the third processing unit 3 for another round of hydrous pyrolysis or solvolysis. Once phase separation is achieved the organic fraction may exit the tank via the outlet 7e or part thereof may be used as energy source on-site for the pyrolysis and/or sold separately e.g. as a fuel to other industries or for the production of fine chemicals.

Figure 6:
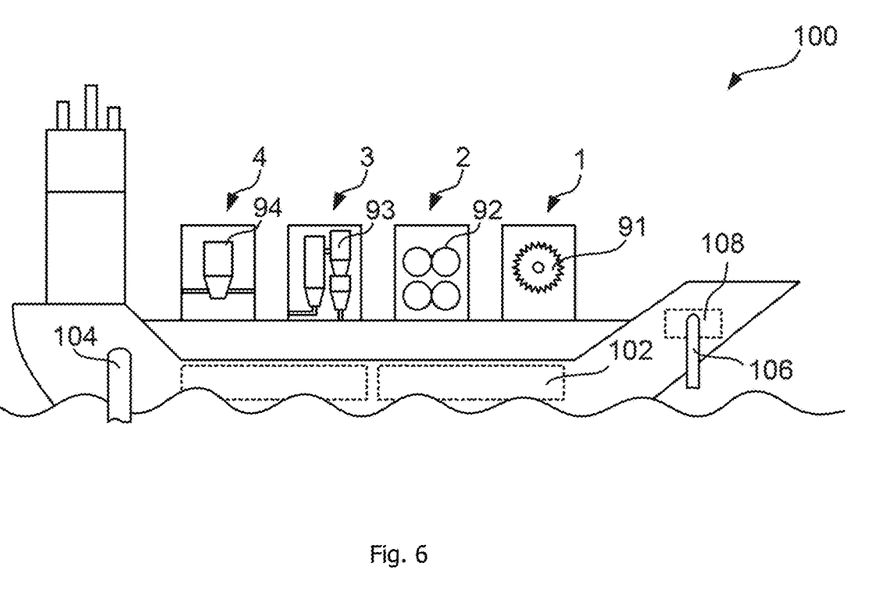

FIG. 6 schematically illustrates an exemplary recycling ship 100 for recycling a composite material rich structure, such as a wind turbine blade, a boat or a ship, comprising fiber reinforced composite material at a site being offshore or at a site in a harbor.

The recycling ship 100 comprises a plurality of processing units 1, 2, 3, 4, including a first processing unit 1 having a first apparatus 91 configured to section the composite material rich structure to a plurality of composite parts.

The plurality of processing units further includes a second processing unit 2 having a second apparatus 92 configured to crush and/or grind the composite parts to composite material granulates.

The plurality of processing units comprise a third processing unit 3 having a third apparatus 93 configured for chemical recycling, such as solvolysis, and/or thermal recycling, such as pyrolysis, of composite material granulates from the second apparatus 92 to a liquid fraction and a solid fiber fraction.

The plurality of processing units comprise a fourth processing unit 4 having a fourth apparatus 94 configured for partitioning of a liquid fraction from the third apparatus 93 to an organic fraction and an aqueous fraction.

The recycling ship 100 comprises one or more storage spaces 102 configured to store one or more of the composite material granulates, the liquid fraction, the solid fiber fraction, the organic fraction and the aqueous fraction.

The recycling ship 100 comprises a water intake 104. The water intake 104 is configured to take in water from where the recycling ship 100 is deployed, e.g. from the sea or from a lake. The water from the water intake may be used in one or more of the processes of the plurality of processing units 1,2,3,4. For example sectioning in the first processing unit 1 and/or the crushing and/or grinding in the second processing unit 2 may be performed with means for dust suppression using water from the water intake 104. Alternatively or additionally, the first processing unit 1 may comprise a waterjet cutter using water from the water intake 104 to section the composite material rich structure.

The recycling ship 100 may comprise a water outlet 106, e.g. to dispense with water used in one or more of the processes, e.g. water from the water intake 104 used in one or more of the processes. The recycling ship may comprise a filtering and/or cleaning unit 108, to filter and/or clean the water prior to being dispensed via the water outlet 106.

The exemplified figures are not intended to be limiting in anyway and the skilled person will be aware of alternative setups while still being within the spirit of the disclosure.

LIST OF REFERENCES 1 first processing unit
2 second processing unit
3 third processing unit
4 fourth processing unit
5 recycling system
6a inlet for receiving a wind turbine blade
6b inlet for receiving blade parts
6c inlet for receiving granulates
6d inlet for receiving liquid fraction
7a outlet for blade parts
7b outlet for granulates
7c outlet for liquid fraction
7d outlet for solid fiber fraction
7e outlet for organic fraction
7f outlet for aqueous fraction
8 hub
10 blade
12 blade part
14 blade tip
15 tip end
16 blade root
17 root end
18 leading edge
20 trailing edge
21 wind turbine
22 tower
23 nacelle
24 first blade shell part (pressure side)
25 leading part of pressure side
26 second blade shell part (suction side)
27 leading part of suction side
28 bond lines/glue joints
30 root region
32 transition region
34 airfoil region
34a first airfoil region
34b second airfoil region
36 first shell part flange
38 second shell part flange
40 shoulder
42 shear web or spar side
50 leading edge protection element
52 first edge
54 second edge
56 third edge
58 fourth edge
60 first surface
62 second surface
64 film layer
64a first film surface
64b second film surface
66 rubber layer
66a first rubber surface
66b second rubber surface
68 first rubber layer position
70 leading edge portion
72 shell material
74 primary surface
75 first part of primary surface
76 secondary surface
78 first part
79 second part
80 mould
82 primary moulding surface
83 first part of primary moulding surface
84 second part of primary moulding surface
86 third part of primary moulding surface
88 coating
91 first apparatus
92 second apparatus
93 third apparatus
94 fourth apparatus
100 recycling ship
102 storage space
104 water intake
106 water outlet
108 filtering/cleaning unit

The invention claimed is:

1. A recycling ship, for recycling a composite material rich structure, comprising fiber reinforced composite material at a site being offshore or at a site in a harbor, the recycling ship comprising a plurality of processing units (1, 2, 3, 4), wherein the plurality of processing units comprises:
a first processing unit (1) having a first apparatus configured to section the composite material rich structure into a plurality of composite parts;
a second processing unit (2) having a second apparatus configured to crush and/or grind the composite parts into composite material granulates, an inlet (6b) arranged to receive the composite parts from the first processing unit and an outlet (7b) for outputting the composite material granulates;
a third processing unit (3) having a third apparatus configured for chemical recycling of the composite material granulates, an inlet (6c) for receiving the composite material granulates, and an outlet (7c) for a liquid fraction and an outlet (7d) for a solid fiber fraction and wherein the outlet (7b) of the second processing unit is arrangeable to be connected to the inlet (6c) of the third processing unit; and
a fourth processing unit (4) having a fourth apparatus configured for partitioning of the liquid fraction, an inlet (6*d*) for receiving the liquid fraction, an outlet (7*e*) for an organic fraction and an outlet (7*f*) for an aqueous fraction and wherein the outlet (7*c*) for the liquid fraction of the third processing unit is arrangeable to be connected to the inlet (6*d*) of the fourth processing unit, the recycling ship being configured to sail to the offshore site and to receive the composite material rich structure by the first processing unit.

2. The recycling ship according to claim 1, wherein the first apparatus comprises a saw and/or a waterjet cutter operable to cut the composite material rich structure.

3. The recycling ship according to claim 1, wherein the first processing unit has an inlet (6*a*) for receiving the composite material rich structure and an outlet (7*a*) for outputting the composite parts, and wherein the inlet (6*b*) of the second processing unit is arrangeable to be connected to the outlet (7*a*) of the first processing unit.

4. The recycling ship according to claim 1 comprising one or more storage spaces configured to store one or more of the composite material granulates, the liquid fraction, the solid fiber fraction, the organic fraction and the aqueous fraction.

5. The recycling ship according to claim 1, comprising a water intake and wherein the sectioning in the first processing unit (1) and/or the crushing and/or grinding in the second processing unit (2) is performed using water from the water intake.

6. A method for offshore recycling of a composite material rich structure, the method comprising:

installing a plurality of processing units (1, 2, 3, 4) on a recycling ship, wherein the plurality of processing units comprises a first processing unit (1) having a first apparatus configured to section the composite material rich structure into a plurality of composite parts, further wherein the plurality of processing units comprises a second processing unit (2) having a second apparatus configured to crush and/or grind the composite parts into composite material granulates, an inlet (6*b*) for receiving the composite parts and an outlet (7*b*) for outputting the composite material granulates;

assembling the plurality of processing units into a decommissioning and recycling system (5) comprising arranging the first processing unit and the second processing unit such that the inlet (6*b*) of the second processing unit is arranged to receive the composite parts from the first processing unit;

sailing the recycling ship to an offshore site of the composite material rich structure;

receiving the composite material rich structure by the first processing unit (1);

sectioning the composite material rich structure by the first apparatus to obtain a plurality of composite parts;

transferring the plurality of composite parts to the second processing unit (2); and mechanical crushing and/or grinding the plurality of composite parts by the second apparatus to obtain composite material granulates, wherein the plurality of processing units (1, 2, 3, 4) comprises a third processing unit (3) having a third apparatus configured for chemical recycling of composite material granulates, an inlet (6*c*) for receiving the composite material granulates, an outlet (7*c*) for a liquid fraction and an outlet (7*d*) for a solid fiber fraction and wherein assembling the plurality of processing units further comprises connecting the outlet (7*b*) of the second processing unit to the inlet (6*c*) of the third processing unit, and the method comprises transferring the composite material granulates via the outlet (7*b*) of the second processing unit and the inlet (6*c*) of the third processing unit to the third apparatus and subjecting the composite material granulates to thermal recycling and/or chemical recycling in the third apparatus to obtain a mixture comprising a liquid fraction and a solid fiber fraction, and wherein the plurality of processing units (1, 2, 3, 4) comprises a fourth processing unit (4) having a fourth apparatus configured for partitioning of the liquid fraction, an inlet (6*d*) for receiving the liquid fraction, an outlet (7*e*) for an organic fraction and an outlet (7*f*) for a aqueous fraction, and wherein assembling of the plurality of processing units further comprises connecting the outlet (7*c*) for the liquid fraction of the third processing unit to the inlet (6*d*) of the fourth processing unit, and the method comprises transferring the liquid fraction via the outlet (7*c*) for the liquid fraction of the third processing unit and the inlet (6*d*) of the fourth processing unit to the fourth apparatus and partitioning the liquid fraction in the fourth apparatus to obtain an organic fraction and an aqueous fraction.

7. The method according to claim 6, wherein the first processing unit has an inlet (6*a*) for receiving the composite material rich structure and an outlet (7*a*) for outputting the composite parts, and wherein the arranging of the first processing unit and the second processing unit comprises connecting the outlet (7*a*) of the first processing unit to the inlet (6*b*) of the second processing unit.

8. The method according to claim 6, wherein each of the plurality of processing units (1, 2, 3, 4) comprises a container containing a respective one of the first apparatus through the fourth apparatus of the processing unit.

9. The method according to claim 6, wherein the ship comprises one or more storage spaces, and the method comprises storing one or more of the composite material granulates, the liquid fraction, the solid fiber fraction, the organic fraction and the aqueous fraction in the one or more storage spaces.

10. The method according to claim 6, wherein the sectioning in the first processing unit (1) and/or the crushing and/or grinding in the second processing unit (2) is performed with means for dust suppression using water.

11. The method according to claim 6, wherein the organic fraction exiting the fourth apparatus via the outlet (7*e*) or part thereof is used as energy source on-site for pyrolysis.

\* \* \* \* \*